Aug. 11, 1964 W. SUERKEMPER 3,144,227
ELECTROMAGNETIC TRACK APPARATUS, PARTICULARLY FOR
AXLE-COUNTING SYSTEMS IN RAILWAY
SAFETY INSTALLATIONS
Filed Aug. 12, 1960 2 Sheets-Sheet 1

INVENTOR
W. Suerkemper

BY R. P. Morris
ATTORNEY 3,144,227
ELECTROMAGNETIC TRACK APPARATUS, PARTICULARLY FOR AXLE-COUNTING SYSTEMS IN RAILWAY SAFETY INSTALLATIONS
Wilhelm Suerkemper, Baden-Wurttemberg, Germany, assignor to International Standard Electric Corporation, New York, N.Y., a corporation of Delaware
Filed Aug. 12, 1960, Ser. No. 49,226
Claims priority, application Germany Aug. 14, 1959
7 Claims. (Cl. 246—249)

The invention relates to an arrangement of track apparatus for supervising the route traversed by railway vehicles, in which coils are arranged on both sides of the rail one of which produces an alternating-current field by means of which a voltage is induced in the other coil. If a wheel passes through the zone between these two coils, then the voltage induced in the receiving coil is varied with respect to its magnitude and thus control the supervisory arrangement for the route.

Arrangements have already become known in which coils are arranged on both sides of a rail. Thus, systems are known in which the coils are arranged on one common iron core surrounding the rail, and, quite depending on the kind of circuit arrangement, a feedback arrangement is acted upon by the effect of the wheel, or the magnetic coupling between the transmitting and receiving coil is amplified. In a further known arrangement of this type, three coils are arranged on the iron cores surrounding the rail. The receiving coil is arranged on the one side of the rail, and the two transmitting coils are arranged on the other side of the rail. The one of these transmitting coils is supplied with direct current, and the other one with alternating current. Furthermore, another type of embodiment is known in which the coils are mounted on both sides of a rail by way of a common, magnetically non-conductive traverse or cross-tie rod. The coil excited by the alternating current is arranged in such a way next to the rail that in this case the produced field of force is only permitted to act intensively upon the receiving coil if a wheel passes through the magnetic alternating field.

In another conventional arrangement, one or more pairs of oppositely wired windings are arranged opposite the alternating field produced on the one side of the rail. These windings are so dimensioned that the voltages induced in each pair of windings annul each other with respect to phase and magnitude. The coils are arranged near the rail in such a way that the voltage equilibrium existing in each pair of windings is disturbed by the passing of a wheel on account of the variation of the airgap. The non-compensated portion of the voltage serves to act upon the supervisory arrangement.

In a further known electromagnetic track apparatus, the screen effect of a wheel passing through the air-gap between the transmitting and receiving coil is utilized for acting upon the system. In order to obtain an optimum interaction in this arrangement, both the transmitter and receiver are arranged above the head of the rail (rail flange head), in order that the screen effect of the rail remains as small as possible. However, since the wheels acting upon the arrangement have different dimensions in accordance with the different types of employed vehicles, the screening of these wheels causes a considerably fluctuating lowering of the voltage induced in the receiving coil, so that an unobjectionable operation of the supervisory arrangement is not always ensured.

The invention is illustrated in the accompanying drawings, in which.

Figure 1:
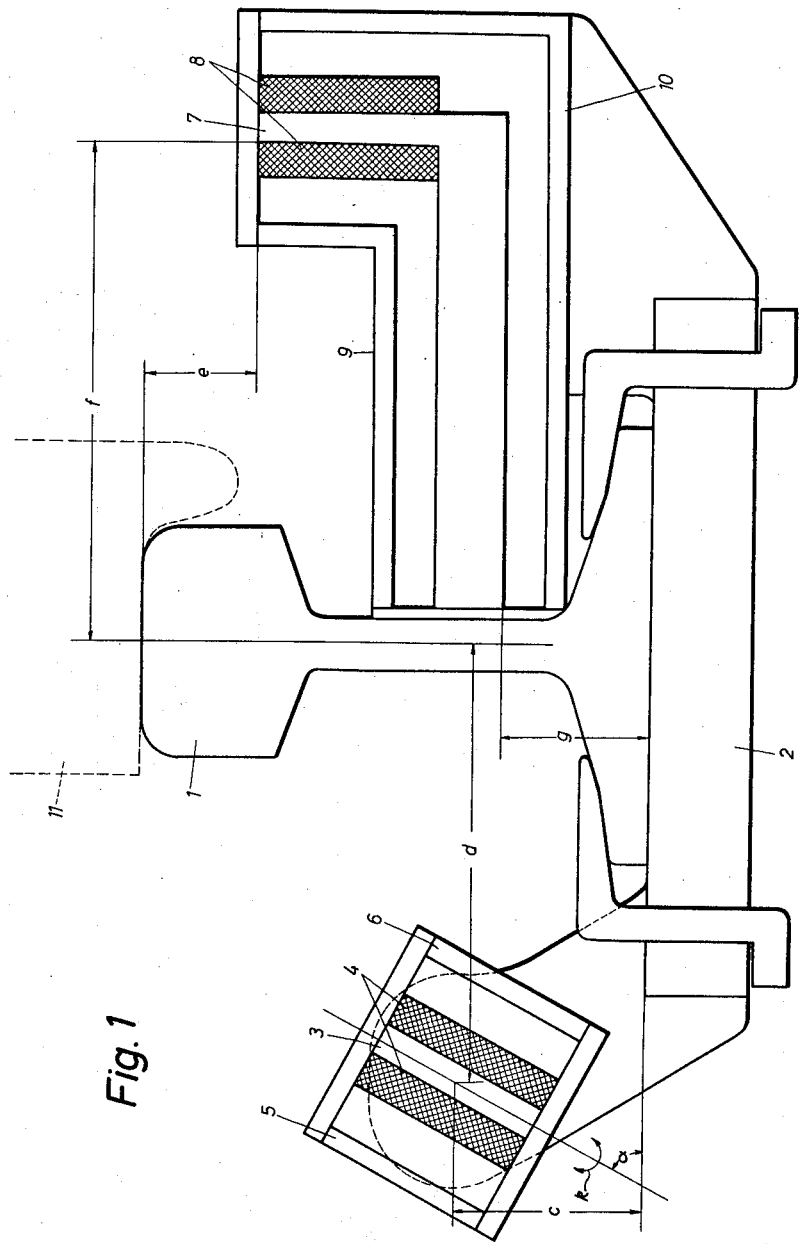
FIG. 1 shows the electromagnetic track apparatus mounted on a rail.

In accordance with the further embodiment of the invention the frequency of the alternating field is so chosen— for example 5 kc./s.—that the cancellation or reversal of the polarity of the effective magnetic field of the coil is effected irrespectively of whether the material of the wheel flange is magnetically conductive (e.g. steel) or consists of a magnetically non-conductive material (for example aluminium). The advantage of this feature of the invention over the prior art resides in the fact that the track apparatus operates unobjectionably irrespectively of whether the wheel or parts of the wheel consist of a magnetically conductive or magnetically non-conductive material. By means of the invention it is also possible satisfactorily to recognize plastic wheels which are reinforced by a metal insert.

A further embodiment of the electromagnetic track apparatus, according to the invention is provided for achieving an optimum control of the partial fluxes flowing in the receiving coil by the action of the wheel flange, and for at least eliminating the effective magnetic alternating field of the coil by the arrangement of the receiver, in which the magnetically conductive, extended core of the coil 8 is attached to the rail web, so that the coil 8 lies in a magnetic bridge arrangement which is supplied by the magnetic alernating field of the coil 4. This bridge arrangement will be explained with reference to FIGURES 2 and 2a.

In order to make sure that an unobjectionable balancing of the bridge arrangement can be achieved, provision is made, in accordance with a further feature of the invention, to arrange the transmitting coil rotatably round an adjustable axis extending parallel in relation to the longitudinal direction of the rail.

A further disadvantage of one of the conventional types of arrangements, in which both the transmitter and receiver, due to the principle of the system, are arranged above the head of the rail, consists in the fact that in addition to the wheels passing through the zone of action to cause an action or effect upon the system other parts attached to the vehicle, such as chains, pipes (tubes), hanging down below the vehicle, or other iron parts which are necessary or required in the performance of the operation, for example, rail brakes, pass through the zone of action of the track or rail apparatus and may be the cause of a faulty operation or disturbance of the supervisory arrangement. It is a further disadvantage of this conventional arrangement that the parts projecting over the rail head are liable to be mechanically damaged. According to the invention these disadvantages are avoided in that both the transmitting coil and the receiving arrangement are arranged below rail level (below the top of the rail). By this advantageous arrangement of the apparatus, only the wheel flange and not the remaining parts of the wheel is necessary for achieving the required lowering (or deaccentuation). This means that all kinds of wheels will always cause the same amount of lowering (or deaccentuation).

Furthermore, the mode of operation of the electromagnetic track apparatus can be improved in that for shielding the magnetic external fields, which have an unfavourable effect upon the efficiency of the system, and for focusing the self-consistent field, the transmitting coil as well as the receiving system, in accordance with the invention, are enclosed by a cover of a magnetically non-conductive material, for example, of aluminium.

If the elecromagnetic track apparatus is used for controlling axle-counting in a system adapted to supervise track sections which are trafficked in both ways, then it is necessary that the "incounting" or "outcounting" of axles in the respective track section be characterized or identified by a direction-dependent criterion. According to the invention, and in the conventional manner, two track apparatuses for effecting the directional counting of axles are arranged in such a way on both rails of a track that the zones of action of both systems overlap each other.

Referring now to FIG. 1, the rail 1 is located on the transverse beam 2 supporting the receiving device 7–10 on the one side of the rail and the rotatable transmitter 3–6 on the other.

The transmitter, by way of example, consists of a rectangular coil 4 which, for shielding purposes, is completely surrounded by a cover of aluminium 5, 6. Both the top and bottom of the shielding or screening cover are made of a material which will permit magnetic flux to pass out freely for example, the material called "Pertinax." The core 3 of the coil may consist of dynamo sheetmetal or of a ferrite, and the coil 4 may consist of several sub- or partial windings. The receiving equipment comprises the coil 8, the core 7 which is extended on one side, the aluminium shielding cover 9, 10 which completely surrounds the receiving coil, and the cover 12 which is made of a material which will permit magnetic flux to pass freely through it. The core of the coil may again consist of dynamo sheetmetal or ferrite.

In order to affect the quality of the electrical circuits as little as possible, the aluminium shielding of the transmitting and receiving equipment is arranged around the coils at a suitably spaced relation.

In dependency upon the different types of rail shapes, and upon the highest possible induction of the system by the action of the wheel flange, the most suitable shape, as well as the position of the transmitter coil, have been determined by way of experiments. Thus it has proved to be of advantage to locate the transmitter at an angle $\alpha$ of 30 to 80° formed by the bottom of the rail and the direction of radiation of the magnet, in relation to the rail head, and to fix the axis of the centre of rotation of the system, extending parallel in relation to the longitudinal direction of the rail, at a distance $d = 80$ to $150$ mm. from the centre of the rail, and at a distance $c = 25$ to $80$ mm. from the bottom of the rail.

However, the magnetic adjustment of the track apparatus, at least within certain limits, could also be achieved by means of an adjustable receiving arrangement, but the constructional embodiment, which is due to the necessary locking of the receiver to the rail web, would present certain difficulties. Moreover the receiver is arranged on the inside of the rail, hence within the track, so that the adjustment would have an impedimental effect upon the operation (train working), and would endanger the persons carrying out the adjustment. With respect to the embodiment of the receiving equipment, however, experiments have resulted in a favourable arrangement near the rail, according to which the attached portion of the core 7 of the coil is arranged at a distance $g = 30$ to $95$ mm. away from the bottom of the rail opposite the web of the rail, and according to which the portion of the core 7 carrying the coil 8 is arranged parallel in relation to the rail web, and, furthermore, the free side of the coil 8 is arranged at a distance $e = 0$ to $60$ mm. below rail level and at a distance $f = 150$ to $185$ mm. from the centre of the rail.

This described arrangement complies with the mode of operation of the electromagnetic track apparatus which is the subject matter of the invention. In the arrangement which is not acted upon by a wheel flange, a certain voltage is produced by the effective magnetic alternating field in the receiving coil 8, which is capable of being adjusted by the inclined position of the transmitting coil in relation to the rail. The adjusting means are schematically indicated by the double headed arrow referenced $k$. If a flange of a wheel is rolling through the zone of action of a track apparatus and enters the airgap between the head of the rail 1 and the coil 8, then, by the action of the wheel flange, the effective alternating field of the coil 8 is eliminated or reversed, so that either no voltage at all, or a voltage shifted in phase by 180° can be induced in the coil. The induced alternating current voltage in the receiver coil 8, which is used for controlling the supervisory arrangement, thus achieves a lowering or deaccentuation of 100 percent or, in excess thereof, a phase reversal which may then be utilized by an in-phase rectification.

By arranging both the transmitting and receiving coil below the rail level, and by inclining the transmitting coil in relation to the rail head, metal parts which only reach to the rail level, for example, rail brakes, only cause a slight lowering of the induced voltage in the receiving coil 8, and have thus no effect upon the subsequently arranged supervisory system.

Figure 2:
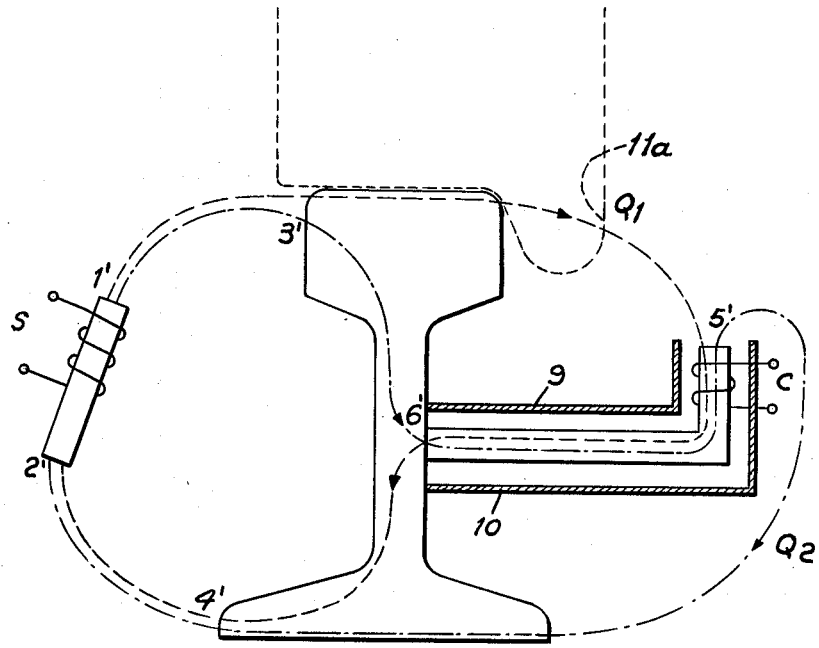
FIG. 2 shows diagrammatically the lines of force required in the bridge arrangement of the electromagnetic treadle.
Figure 2A:
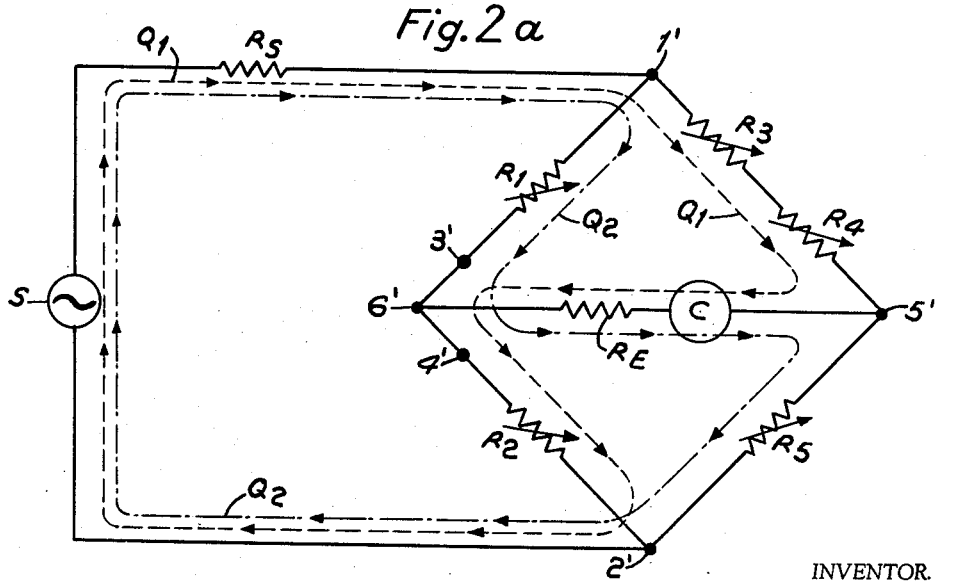
FIG. 2a is a simplified equivalent electrical circuit of the bridge arrangement of FIG. 2.

The mode of operation of the electromagnetic treadle may be explained in greater detail referring to FIG. 2 showing the lines of flux necessary for the bridge arrangement and to FIG. 2a showing the simplified equivalent circuit. To facilitate the comparison between the flux diagram and the equivalent circuit, the points 1'–6' corresponding to each other are designated with the same numbers. Thus, for instance, the magnetic flux line between the points 2' and 4' in the flux diagram of FIG. 2 is represented by the resistance between points 2' and 4' in the equivalent circuit of FIG. 2a; the coil C of the receiver is located in the diagonal leg 5'/6' of the bridge. As may be seen from the flux diagram, the bridge is formed by the special shape (L shape) of the magnetic core.

When the transmitting coil is shifted in a horizontal direction, towards and away from the rail, this will essentially affect the reluctances 1'/3' and 2'/4'. This causes the voltage applied to the bridge at points 3' and 4' to increase or decrease; in other words, the coupling between transmitter and receiver is varied. Although the reluctances 1'/3' and 2'/4' are so affected by the rotation of the transmitting coil that the reluctance between 2' and 4' decreases with the increasing reluctance between 1' and 3', it is particularly the bridge reluctances 3'/5' and 4'/5' that are affected. This action permits adjustment of the bridge. The effect of a wheel, particularly the wheel rim, upon the flux path between 3' and 5' consists in changing the reluctance 3'/5' and thus changing the bridge relations. The bridge arrangement can be so adjusted that if the electromagnetic treadle is not actuated, i.e. there is no wheel in its effective region, the bridge is not balanced, so that a certain amount of the energy set up by the transmitting head becomes effective. As soon as a wheel enters the effective zone of the treadle, the bridge becomes balanced and the voltage induced in the receiving coil drops to zero. On the other hand, a wheel passing through the effective region of the treadle may cause to drop the voltage induced in the receiving coil to drop to zero, depending on the distance traveled by the wheel, and then to increase to a certain amount with a phase shifted by 180°.

The arrangement of the magnetic bridge will now be explained with reference to FIGURES 2 and 2a. The coil S represents the transmitting coil and the coil C the receiving coil. Reference numbers 9, 10 indicate the housing for the receiving coil shown in FIGURE 1. The alternating flux generated by the transmitting coil S is passed to the core of receiving coil C via two different paths referenced $Q_1$ and $Q_2$ respectively. The flux paths $Q_1$ and $Q_2$ each have opposite directions through the coil C itself. It is to be noted that the configuration of the paths is due to the arrangement of the transmitting and receiving coils, the L-shaped core of the coil C, and magnetically non-conductive housing 9, 10. The magnetic flux paths can only enter or depart from the receiving core at the points 5' or 6'. The angle of the transmitting coil and its core with respect to the track produces the two flux paths $Q_1$ and $Q_2$.

Flux path $Q_1$ initially proceeds from point 1' through the top of the rail head to 5', then via the core of the receiver to 6' and finally via the rail to 4' and back to the transmitting coil at 2'. Flux path $Q_2$ initially proceeds from points 1' to 3', then, via the rail, it enters the core at 6' so that it exits at 5', and finally proceeds via the rail foot to 4' and back to the transmitting coil at 2'. In FIG. 2 it can be seen that only the rail flange 11a will affect the reluctance of path $Q_1$.

The resistors of FIGURE 2a represent the reluctances present in the arrangement of FIGURE 2. Resistor $R_1$ represents the reluctance of the airgap between points 1' and 3', resistor $R_2$ represents the reluctance of the airgap between points 4' and 2'; resistor $R_3$ represents the reluctances of the airgap between the flange head and 5' and between 1' and 3', and resistor $R_5$ represents reluctances of the airgap between points 5' and the rail foot and between 2' and 4'. It is important to note that the reluctances in the airgaps between points 4' and 2' and points 1' and 3' are each included in two different resistors so that the flux lines $Q_1$ and $Q_2$ shown in FIG. 2a follow paths which are exactly equivalent to the paths the flux lines $Q_1$ and $Q_2$ follow in FIG. 2. Resistor $R_4$ represents the variable reluctance which can be caused by the presence of a rail flange. Resistors $R_1$, $R_2$, $R_3$, and $R_5$ are also shown as variable resistances since the angle $\alpha$ at which the transmitted coil is set can be varied to effect desired changes in these resistances. Resistors have not been shown for the reluctance of the rail between points 3' and 6' and 4' and 6' as the reluctance is negligible compared to that of the airgaps and the reluctance for these portions of the paths $Q_2$ and $Q_1$, respectively, are constant. Resistor $R_s$ represents the internal reluctance of transmitting coil S, and resistor $R_E$ represents the internal reluctance of the L-shaped core of the receiving coil.

Flux lines $Q_1$ and $Q_2$ shown in FIGURE 2a illustrate the paths the respective flux lines would follow through the equivalent electrical circuit. It can be seen that the arrangement acts as a magnetic bridge in that the flux along the paths $Q_1$ and $Q_2$ can be balanced to produce no indication at the coil or a desired indication. If balanced initially the presence of a wheel flange will cause an imbalance and so indicate the presence of a wheel.

The electromagnetic track apparatus of the invention is not only suitable for controlling axle-counting systems, but may be advantageously used in all cases for the controlling of arrangements in which a track section is supposed to be controlled by the action of a moving train, for example, for the protection of level crossings, controlling of signalling arrangements, for indicating the track occupany. In addition thereto, the track apparatus, according to the invention, is suitable for supervising the train speed, in that the characteristic and/or the time duration of the lowering of the induced voltage in the receiver coil is used as a criterion, or in that the time required for passing through a measuring or test section between two track apparatuses is measured and is used as a measurement for calculating the speed.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Electromagnetic track apparatus for railroad-car axle-counting systems comprising a transmitting coil positioned on one side of one of the rails of the track, a receiving coil positioned on the other side of said rail, said transmitting coil being adapted to generate an alternating magnetic field, whereby a voltage is induced in said receiving coil the magnitude of which is altered by the presence of a railroad car wheel in the region of said field, means for mounting said receiving coil so as to form a magnetic bridge, said means comprising a low reluctance arm extending at a right angle free from the lower part of the core of which it is an integral part and attached to said rail at a point between the rail head and the rail foot, a house of magnetically non-conductive material surrounding said mounting means and said receiving coil so that the flux lines of said field follow predetermined paths in said magnetic bridge, and adjustable means for mounting said transmitting coil at such an angle with respect to said rail that the presence of a flange of a railroad car wheel in the gap between said rail head and said receiving coil will alter the alternating magnetic field acting upon said receiving coil.

2. Electromagnetic track apparatus, as defined in claim 1, in which the adjustable mounting means for the transmitting coil permits rotation of said coil in the plane of its axis and on an axis parallel to the rail.

3. Electromagnetic track apparatus, as defined in claim 2, in which both the transmitting and receiving coils are mounted at a level underneath that of the top of the rail head.

4. Electromagnetic track apparatus, as defined in claim 3, in which the frequency of the alternating magnetic field produced by the transmitting coil is so chosen that the receiving coil is affected by the presence of a wheel flange irrespective of whether or not said flange is magnetically conductive.

5. Electromagnetic track apparatus, as defined in claim 4, in which the transmitting coil is surrounded by a housing of magnetically non-conductive material.

6. Electromagnetic track apparatus, as defined in claim 1, in which the frequency of the alternating magnetic field produced by the transmitting coil is so chosen that the receiving coil is affected by the presence of a wheel flange irrespective of whether or not said flange is magnetically conductive.

7. Electromagnetic track apparatus, as defined in claim 1, in which the transmitting coil is surrounded by a housing of magnetically non-conductive material.

References Cited in the file of this patent

UNITED STATES PATENTS

| 2,442,491 | Gieskieng | June 1, 1948 |
| 2,892,078 | Orthuber | June 23, 1959 |
| 2,966,582 | Wachtel | Dec. 27, 1960 |

FOREIGN PATENTS

| 788,453 | Great Britain | Jan. 2, 1958 |
| 817,085 | Great Britain | July 22, 1959 |
| 1,220,133 | France | Jan. 4, 1960 |